US005230821A

United States Patent [19]

Larson et al.

[11] Patent Number: 5,230,821

[45] Date of Patent: Jul. 27, 1993

[54] CLEANING COMPOSITION

[75] Inventors: John C. Larson, Clarkston, Mich.; Gary L. Horton, Ponca City, Okla.

[73] Assignee: E. I. Du Pont de Nemours and Company, Wilmington, Del.

[21] Appl. No.: 801,917

[22] Filed: Dec. 3, 1991

[51] Int. Cl.$^5$ .......................... C09D 9/00; C11D 7/50

[52] U.S. Cl. .................................... 252/170; 252/162; 252/173; 252/174.21; 252/DIG. 14

[58] Field of Search ........... 252/170, 173, 162, 174.21, 252/DIG. 14

[56] References Cited

U.S. PATENT DOCUMENTS 4,446,044 5/1984 Rutkiewic et al. ................ 252/170
4,927,556 5/1990 Pokorny ............................ 252/173
5,011,620 4/1991 Dishart et al. ..................... 252/118
5,084,200 1/1992 Dishart et al. ................ 252/174.21

*Primary Examiner*—Helen M. S. Sneed
*Assistant Examiner*—Nhat D. Phan
*Attorney, Agent, or Firm*—Chris P. Konkol

[57] ABSTRACT

A cleaning composition comprises an aqueous emulsion of a non-aromatic organic phase stabilized with a blend of surfactants. The emulsion is characterized by a low content of volatile organic compounds (VOC) and superior cleaning properties. This cleaner is particularly useful for removing both water soluble and organic solvent soluble materials from automotive surfaces being refinished.

9 Claims, No Drawings

CLEANING COMPOSITION

BACKGROUND OF THE INVENTION

This invention relates to aqueous cleaning compositions for a variety of applications. It is anticipated that the invention will be particularly useful in automobile refinish shops, i.e., for the cleaning of the surface of an automobile or other vehicle prior to repair and/or repainting.

Automobile refinish shops have for many years utilized special cleaning fluids formulated to remove residual wax, tar, sanding dust, and overall grime from automobile surfaces upon which work is being performed. Although such cleaning fluids have proven to be effective for most types of residue, they have the distinct disadvantage of being composed predominantly of organic solvents. In an era of increasingly stringent solvent emission regulations, solvent-based cleaners present a potential problem. It is estimated that approximately forty percent of the effluent in refinish shops is due not to the paint itself, but rather to the cleaning fluid. Conventional solvent-based cleaning fluids have the additional disadvantage of being unable to readily remove water-soluble dirt, e.g., tree sap and bird droppings, from automotive surfaces.

Cleaning compositions for use in refinishing have been disclosed in various patents. For example, U.S. Pat. No. 4,446,044 discloses a cleaner that has a low VOC (a low content of volatile organic compounds), which cleaner comprises non-ionic ethoxylated surfactants for use in refinish applications. However, this cleaner is a water-in-oil emulsion. U.S. Pat. No. 5,011,620 discloses a cleaning composition comprising a dibasic ester solvent and a hydrocarbon solvent.

There remains a need for a cleaning fluid which not only will facilitate compliance with both current and proposed air pollution standards, but also will remove both organic solvent soluble and water soluble dirt from automotive or other surfaces.

SUMMARY OF THE INVENTION

There is provided by the present invention a composition which possesses excellent cleaning properties and is effective in removing both water soluble and organic solvent soluble materials. The composition is an organic liquid in water emulsion comprising 80 to 97 percent by weight of water and 3 to 20 percent by weight of an organic phase. The organic phase comprises:

1) a hydrocarbon solvent which is essentially non-aromatic and comprises predominantly cycloparaffinic hydrocarbon compounds;

2) an alkyl ester; and 3) a surfactant or blend of surfactants having an HLB in the range of 10.5 to 13.5.

In a preferred embodiment, the organic phase comprises one or more dialkyl esters such as dibutyl ester. In another aspect of the present invention, the above described cleaning composition is employed to clean the surface of an automotive or other vehicle prior to refinishing.

DETAILED DESCRIPTION OF THE INVENTION

This invention is directed to a cleaning composition that has a relatively low VOC (content of volatile organic compounds). Further, the composition is biodegradable, relatively non-toxic, and preferably non-inhibitory to bacteria at concentrations greater than those expected in waste water effluent. It is formulated with a combination of polar and non-polar components to give it good performance in removing a wide variety of soils.

The present cleaning composition can be used for a variety of applications, including but not limited to cleaning of automotive surfaces to be refinished, maintenance cleaning of aircraft and trucks, cleaning of vehicle chassis in assembly, and household cleaning. The cleaning composition is particularly useful where the object being cleaned has cracks or crevices where wiping is difficult and/or for heavy duty cleaning where grease, dust, and/or adhesives are present.

The present invention is especially useful in the area of automotive refinishing. It removes the uncommonly wide variety of soils encountered in body shops. It does not leave a film, so that good adhesion of the new finish is obtained. In addition, it can be used with the same wiping technique employed by most users with previous environmentally non-compliant cleaners. It works well over primers, including water based primers, for removing sanding sludge and other soils. While the surface to be cleaned will ordinarily be composed of a polymeric material, e.g. the type of material used for primer, intermediate, or final costs, the novel composition of this invention will also clean bare metal surfaces. The formulation is a water emulsion of an organic phase. This organic phase comprises:

1) 75 to 95% by weight of a hydrocarbon solvent which is principally (at least 50%) cycloparaffinic (naphthenic), preferably 60 to 70% by weight cycloparaffinic, with a lesser amount of isoparaffinic compounds. It is especially important that this solvent is essentially non-aromatic, which means that the solvent, during manufacture, is hydrosaturated to a level of aromatics less than 0.5%. The boiling range is suitably 340° F. to 440° F. Typically, the flash point by Tag closed cup is about 145° F. Sulfur and nitrogen containing compounds are preferably extremely low.

2) 2 to 20% percent by weight of an alkyl ester or mixtures thereof.

3) 3 to 20% by weight of a surfactant.

Surfactants are used to disperse the organic phase as droplets in the continuous water phase. A preferred surfactant, preferably in the amount of 8 to 12% by weight of the organic phase, is a blend of secondary alcohols which are ethoxylated with ethylene oxide.

The present composition is an emulsion in which the continuous phase and major component is water. The emulsion contains 80 to 97% percent by weight of water. There are a number of advantages to substituting water for those organic solvents which ordinarily constitute the bulk of a cleaning fluid. Because water is noninflammable, odorless, and nontoxic, large quantities of water are more easily handled than like quantities of most organic solvents. Replacing organic solvents with water will, of course, decrease the solvent emission level and thereby reduce the potential air pollution. Still another advantage and an important commercial consideration is water's nominal cost and ready availability. In the present composition, there are no significant differences between hard (demineralized) and soft water.

The package VOC of the present composition is 0.25 to 1.40, preferably 0.30 to 0.40 lbs/gal, which is well below current and emerging regulations (for example, California rule 1151 mandating a VOC limit of 1.40 lbs/gal).

The organic phase of the emulsion is dispersed as small globules in water. More specifically, 3 to 20 percent by weight of the composition is an organic phase. The organic phase contains a hydrocarbon solvent, an alkyl ester solvent, and a surfactant, which serves to emulsify and stabilize the organic solvent phase.

The organic phase is essentially non-aromatic. It is primarily an organic solvent. Suitable solvents include aliphatics, cycloparaffins, isoparaffins, paraffins, and diolefins such as terpenes, or mixtures thereof. Such solvents may be petroleum or naturally derived. In one embodiment of the invention, the organic solvent is principally cycloparaffinic (naphthenic), with the balance comprising a component isoparaffinic in nature. During the process of manufacture, this solvent product is hydrosaturated to a level of aromatics less than 0.5%. (In comparison, mineral spirits may be 5–10% aromatic). One preferred hydrocarbon solvent typically exhibits a boiling range of 340° F. to 440° F., a flash point by Tag closed cup of about 145° F. The levels of sulfur and nitrogen containing compounds are extremely low. A hydrocarbon solvent meeting these specifications is commercially produced and marketed by Du Pont under the trademark CONOSOL C-140.

The emulsion of the present invention contains at least one surfactant. Although ionic surfactants such as sulfonates, phosphates, or amine sulfonates are suitable, the preferred surfactants employed in the present invention are nonionic organic compounds. Although phase separation, or even complete destabilization of the emulsion, may result from sufficient temperature changes, homogeneity can be restored by shaking.

Preferred organic solvent soluble surfactants, which are non-ionic and biodegradable, belong to the class of ethoxylated alcohols, preferably a blend of such alcohols. A general structural formula is $C_{11-15}H_{23-31}[CH_2CH_2O]_xH$ wherein x is variable. One such surfactant is TERGITOL 15-S-3, which is commercially available from Union Carbide. It is a blend of $C_{11}$–$C_{15}$ ethoxylated secondary alcohols, an alkoxypolyethylene oxyethanol reacted with ethylene oxide where x in the above formula is, on average, about 3. The HLB is 8.3 and the molecular weight is 324–345. TERGITOL 15-S-7 is another such surfactant which is has an HLB of about 12.4, a molecular weight of 515, and x in the above formula is on average about 7. Blends of the afore-mentioned TERGITOL surfactants, have been found to work well.

The preferred HLB for the surfactant, or mixtures thereof, is in the range of 10.5 to 13.5. The term HLB is an acronym for Hydrophile-Lipophile-Balance, according to which each surfactant has a distinctive number which is its HLB number. The lower the HLB value, the more lipophilic the surfactant, and the higher the HLB value, the more hydrophilic. See *Emulsion Theory And Practice*, by Paul Becher, Reinhold Publishing (1957).

Other suitable surfactants are poly(oxypropylene)-poly(oxyethylene) as disclosed in U.S. Pat. No. 4,446,044, hereby incorporated by reference in its entirety.

The surfactants are suitably employed in the present composition at a level of about 0.30 to 2.00 percent by weight of the total composition.

The present composition further comprises, as part of the organic phase, one or more alkyl esters. Althought monobasic esters, such as EXXATE from Exxon, are suitable, the preferred alkyl ester are $C_3$–$C_{10}$ dibasic esters or mixtures thereof. A preferred mixture comprises linear $C_4$, $C_5$, and $C_6$ di-isobutyl esters. Such a product is commercially available from Du Pont Chemicals (Wilmington, Del.).

The term alkyl ester is employed in its normal definition and includes monobasic or multibasic alkyl esters having typically 3 to 10 carbon atoms, in which the alkyl group has 1 to 8 carbon atoms, preferably 1 to 4 carbon atoms. Typical are dialkyl esters of dicarboxylic acids (dibasic acids) capable of undergoing reactions of the ester group, such as hydrolysis and saponification. Conventionally at low and high pH they can be hydrolyzed to their corresponding alcohols and dibasic acids or acid salts. Preferred dibasic ester solvents are dialkyl adipate, dialkyl gluterate, dialkyl succinate, and mixtures thereof. Ester groups, which may be derived from alcohols, include methyl, ethyl, propyl, isopropyl, butyl, isobutyl, amyl, ethylhexyl and mixtures thereof. Also, the acid portion of these esters can be derived from other lower and higher molecular weight dibasic acids, such as oxalic, malonic, pimelic, suberic, and azelaic acids and mixtures thereof including the preferred dibasic acids. Multibasic esters such as trialkyl citrate may be employed.

If a combination of esters is employed, the respective amounts are not considered critical and commercially available mixtures may be directly utilized. The precise concentration or ratio of dibasic ester in the organic phase is not considered critical and the percentage thereof can vary from 2 to 20%, preferably about 5% by weight. Based on the total composition, the alkyl ester is preferably present in the range of about 0.15 to 1.0% by weight, whereas the hydrocarbon solvent is preferably present in the range of about 2 to 17% by weight.

The composition of the present invention can be varied depending upon the particular purpose to which it is to be aimed, the type of soils to be cleaned, and the properties required for such a purpose. For example, a composition having 5% by weight of the organic phase may be preferred for some applications such as automobile refinish, while a composition having 10–15% by weight of the organic phase may be desirable for the cleaning assembly soil from heavy duty trucks prior to painting.

Because the emulsion of the present invention has particular utility as a cleaner for automotive refinish purposes, it must not interfere with intercoat adhesion, i.e., the ability of the subsequently applied coat of paint or finish to adhere to the newly-cleaned surface. Upon evaporation of the solvent and water components of the emulsion, some of the surfactant typically will be left behind on the vehicle surface. As the surface is painted, it is surmised that the surfactant blend will readily dissolve into the paint solvent to preclude the surfactant remaining on the surface and interfering with intercoat adhesion. It should be noted that, although the insertion of an additional washing step between the cleaning and painting steps would alleviate the problem of surfactant interference, such a step may not be commercially practical. At present, refinish practice does not require a washing step, as the current solvent-based cleaners quickly volatilize. The necessity of adding an extra costly, labor-intensive step would undoubtedly not be looked upon favorably by automotive refinish shops.

The present composition can be prepared by a conventional process of emulsification utilizing a high pressure homogenizer, to obtain an average droplet size of 50 to 1000 nanometers (0.05 to 1.0 micrometers), preferably 50 to 750 nanometers, and most preferably a solvent droplet average diameter of 150–250 nanometers, such that good emulsion stability is obtained. A small emulsion droplet size also enhances the efficiency of the product, keeping the organic solvent concentration (VOC) low. Various conventional mixing methods may also be employed. The skilled artisan will appreciate that the stability of an emulsion is affected by many parameters. In addition to the choice of surfactants and the concentration of the various components, process considerations, e.g., the mixing equipment, the sequence in which the ingredients are added, the speed and duration of the process, and temperature changes, may have an effect.

Normally the organic components, including the surfactants, are blended together in advance. The aqueous water phase is added to a mixer, followed by the appropriate amount of organic phase. The composition forms an emulsion immediately upon pouring the organics into the water. This emulsion requires light agitation to remain homogenous. The organic droplet size is 1500 to 2000 nanometers. This large droplet emulsion is then fed into a high pressure homogenizer. Two methods can be employed to achieve an emulsion droplet size in the desired range. Recirculation of the processed material back into the feed tank for a total of 3 tank turnovers will reduce the droplet size to the 150–250 nanometer range. As an alternative, a two tank process can be used. The product from one tank is processed throught the homogenizer into the second tank, then back again through the homogenizer to the first tank. Experience has shown that two passes through the homogenizer are needed to ensure an emulsion droplet size in the preferred range. After processing, the emulsion is normally stable for 4 to 6 weeks. Storage at temperatures above 100° F. may reduce the stability. The separated composition is easily reemulsified by mild shaking.

Once formed, the cleaning composition of the present invention will remain stable and retain its cleaning power under normal conditions, including temperature changes, for reasonable periods of time, although agitation prior to use may be needed if the composition has been stored for an extended period of time.

The present composition is designed to remove a wide variety of soils. A combination of polar and nonpolar components comprising the composition provides the proper balance of selective solvency to remove, from a variety of surfaces, wax, grease, silicones, dirt, oxidized paint, tar, undercoating, tree sap, insect remnants, salt/road films, and various adhesives. As indicated above, the present composition is especially useful in automotive refinish body shops, for precleaning substrates prior to beginning the repair procedure, for wiping to remove sanding dust and sludge during the repair procedure, and for making a final wipe prior to painting. However, because of its low toxicity and biodegradability, the present cleaning composition may be used in other commercial areas and in the home.

Application of the composition may be by hand and may be accomplished by soaking a cloth with it and then wiping the surface to be cleaned in order to loosen/lift any soil or dirt. This preferably should be followed immediately by wiping with a clean, dry cloth to remove the cleaning composition and the soil. If the cleaning composition is left on the substrate to dry without wiping with a clean cloth, the surface is preferably rewet with a cloth soaked in the cleaning solution and then wiped immediately with a clean cloth.

The composition can also be applied to the surface with a spray bottle. In this case, the surface to be cleaned may be sprayed generously with the cleaning composition, wiped with a cloth to loosen/lift the soil and then immediately wiped dry with a clean, dry cloth.

In the case of hard to remove soils such as tar, undercoating, tree sap, and the like, it is advisable to wet the surface well with the cleaning composition, allow the surface to remain wet for a couple of minutes, and then to wipe to loosen and lift the soil and wipe dry with a clean, dry cloth.

This invention is illustrated but not limited by the following example in which all parts are by weight.

EXAMPLE

A hydrocarbon solvent (principally cycoparaffinic and isoparaffinic) (42.5 parts) and C4, C5 and $C_6$ diisobutyl ester mixture (2.5 parts) is combined with a mixture of secondary alcohol ethoxylates (5.0 parts) and mixed until blended homogeneous, about 5 minutes. Demineralized (or softened) water (950 parts) is added with mixing. An oil in water emulsion is formed with an average oil droplet size in the 1.5–2.5 micrometer range. This emulsion is stable for only a short time (5–10 minutes). The initial emulsion is kept under agitation until it is further processed in a high pressure homogenizer. The homogenizer, operating at 2000–6000 psig further reduces the average droplet size to 0.15 to 0.25 micrometers. This creates emulsion stability. The droplet size is measured with a Coulter particle size counter. The stability can also be determined by measuring the haze or turbidity in a diluted sample with a hazometer or turbidity meter. An indicational stability can also be achieved by measuring the "whiteness" of the sample with a colorimeter having a liquid cell.

The emulsion is applied to a dry cloth and tested for cleaning power using standard procedures. A waxed automotive panel is rubbed with the emulsion-containing cloth and allowed to dry. The panel is then swabbed with a cotton swab which has been soaked with hexylene glycol. The surface tension of a waxed finish is about 26 dynes/cm, whereas the surface tension of an unwaxed finish is about 35 dynes/cm. Hexylene glycol, having a surface tension of about 29 dynes/cm, is a useful indicator of wax removal, as it will wet a wax-free surface but will not wet a waxed surface. This test reveals that all the wax has been removed from the panel by the cleaning emulsion, because the hexylene glycol stays in contact with the panel with no visible crawling or creeping.

Next, an automotive panel is coated with stripes of road tar. Holes are punched in strips of masking tape and placed over the tar stripes. A few drops of emulsion are placed in each hole, allowed to stand for several minutes, and dabbed off with paper towels. No tar remains beneath the holes. Panels containing various other substances commonly encountered on automotive panels, e.g., mud, sanding dust, bird and insect excrement, and tree sap, are cleaned with the emulsion. In each instance, the substance is totally removed.

Freeze/thaw and oven stability tests are conducted to determine the emulsion's capacity for remaining stable upon undergoing severe temperature change. Samples of the emulsion are placed in an oven and kept at 120° F. for eleven days. When removed on the twelfth day, the emulsion is slightly separated. The white organic phase is moving toward the top and clear water is settling to the bottom. The emulsion is easily reemulsified by mild shaking. Its cleaning ability is not effected. Next, the samples of emulsion are frozen, thawed, frozen a second time, and again thawed. Although some separation occurs, mild shaking reemulsifies it and its cleaning power is unaffected.

Finally, intercoat adhesion tape tests are conducted to ascertain that use of the cleaning emulsion will not interfere with the adhesive capabilities of the cleaned surface. An automotive panel is first cleaned with the emulsion and allowed to dry. The panel is then sprayed with conventional automotive paint and air dried. There is no additional washing step between the cleaning of the panel and its painting. The dried panel is then scored, with "X"-shaped cuts extending completely through the newly-applied topcoat. Strips of masking tape are affixed to the panel, over the cuts, and are pulled. The painted surface remains virtually intact, indicating that use of the emulsion will not interfere with intercoat adhesion.

While the preferred embodiments of this invention have been described above in detail, it will be understood that variations and modifications can be made therein without departing from the spirit and scope of the present invention as set forth in the appended claims.

We claim:

1. A cleaning composition comprising 80 to 97 percent by weight of an aqueous continuous phase and 3 to 20 percent by weight of a dispersed organic phase comprising, by weight of the dispersed organic phase, the following:

a) 75 to 95 percent of a hydrocarbon solvent which comprises predominantly cycloparaffinic compounds and having less than 0.5% by weight aromatics;

b) 3 to 20 percent of at least one surfactant;

c) 2 to 20 percent of at least one alkyl ester; and wherein the composition is an emulsion in which the average droplet size of the dispersed organic phase is about 150 to 250 nanometers.

2. The composition of claim 1, wherein the surfactant is an ethoxylated and/or propoxylated alcohol.

3. The composition of claim 1, wherein the akyl ester is a monobasic or multibasic alkyl ester.

4. The composition of claim 3, wherein the alkyl ester comprises one or more $C_3$ to $C_{10}$ dialkyl esters.

5. The composition of claim 4, wherein said dialkyl ester comprises a di-isobutyl or dimethyl ester.

6. The composition of claim 4, wherein said akyl ester comprises an ester of adipic acid, glutaric acid, succinic acid, or combinations thereof.

7. The composition of claim 1, wherein the hydrophile-lipophile balance, referred to as HLB, of the surfactant is 10.5 to 13.5.

8. The composition of claim 2, wherein the structural formula of the surfactant is $C_{11-15}H_{23-31}O[CH_2CH_2O]_nH$, wherein n has an average value of 3 to 7.

9. The composition of claim 1, wherein the volatile organic compound, referred to as VOC, content of the cleaning composition is 0.25 to 1.4 (lbs VOC)/(gal of the cleaning composition).

* * * * *